Patented June 7, 1949

UNITED STATES PATENT OFFICE 2,472,269

2,2-BIS-(4-METHYLTHIOPHENYL)-1,1,1-TRICHLOROETHANE

David A. Shirley, Wilmington, Del., assignor to E. I. du Pont de Nemours & Company, Wilmington, Del., a corporation of Delaware No Drawing. Application August 9, 1946, Serial No. 689,515

1 Claim. (Cl. 260—609)

This invention relates to 2,2-bis(4-methylthiophenyl)-1,1,1-trichloroethane and to insecticidal compositions and methods employing the compound as an active toxicant.

The compound of this invention may be represented by the formula

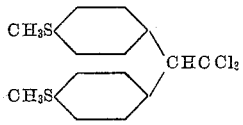

2,2-bis(4-methylthiophenyl)-1,1,1-trichloroethane may be prepared by the condensation of methyl phenyl sulfide with chloral. The reaction is readily effected by bringing together reactants in the proportions of at least 2 moles of the methyl phenyl sulfide for each mole of chloral in the presence of aluminum chloride as a catalyst. Other compounds suitable for catalyzing Friedel and Crafts' type reactions, such as boron trifluoride and hydrogen fluoride, may also be employed as the catalyst for the condensation reaction.

The 2,2-bis(4-methylthiophenyl)-1,1,1-trichloroethane of this invention has been found particularly effective in suitable compositions with insecticidal adjuvants for the control of a number of different insects.

It is intended that the term "insect" include those small invertebrate animals belonging mostly to the class insecta comprising six-legged, usually winged forms, such as beetles, bugs, bees, and flies; and also other allied classes of arthropods whose members are wingless and usually have more than six legs, such as spiders, mites, ticks, centipedes, and wood lice.

The term "insecticidal adjuvant" includes substances which are capable of presenting, or aiding in the presentation of, an insect toxicant to an insect. The term "adjuvant" is well established in the art where it is recognized that an active agent or toxicant is in itself of little practical utility for combatting insects unless it be presented in a form suitable for effecting intimate contact of the agent or its vapors, as the particular case may require, with the insects. Thus additional material or materials are employed in the formulation of an active agent to yield a suitable insecticidal composition, such materials being termed "adjuvants."

Those conversant with the art know the adjuvants which may be combined with a suitable toxicant or combination of toxicants to yield a composition suited to the control of a particular insect or combination of insects, having in mind the nature of the insect, its particular habitat and feeding habits, and its peculiar susceptibilities, if any. I have found that insecticidal adjuvants and toxicants can be combined similarly in various formulations with the 2,2-bis(4-methylthiophenyl)-1,1,1-trichloroethane of this invention to yield effective insecticidal compositions.

Preferably the compounds of the invention are formulated with appropriate insecticidal adjuvants in the form of solutions in a suitable solvent, dust compositions, or slurries or emulsions in water according to the requirements of control of the particular pest involved.

Where a solution of the active agent in a solvent is desired such as for use in a fly spray composition, the adjuvant may be a hydrocarbon and is preferably a refined kerosene of the type known in the art as a fly spray base solvent. Alternatively, solvents such as trichloroethylene, tetrachloroethylene, alkylated naphthalenes, xylene, toluene, cyclohexanone, and acetone may be employed, but they do not possess the economic and other practical advantages of refined kerosene.

The adjuvant employed when a dust composition is desirable is preferably selected from the class of finely divided solids comprising talcs, pyrophyllite, natural clays, and diatomaceous earth, such materials having a frequency particle size of less than 50 microns. Other adjuvants which may be used in dust compositions include such finely divided powders as calcium phosphate, calcium carbonate, magnesium carbonate, sulfur, lime, and flours such as walnut shell, wheat, redwood, soya bean, and cottonseed.

An insecticidal composition for use as a slurry dispersed in water is produced preferably in the form of a powder containing one of the adjuvants common to the dust compositions described above, said powder then being dispersed for actual usage in the water usually with the aid of an adjuvant such as a wetting, dispersing, or emulsifying agent. Typical of the adjuvants of this type are materials such as the sulfated higher alcohols, polyvinyl alcohols, polyethylene oxides, the alkali metal or amine salts of oleic acid, the sulfonated animal and vegetable oils such as sulfonated fish and castor oils, the sulfonated petroleum oils, alkali metal salts of alkylnaphthalene sulfonic acids, and such proprietary preparations as are listed in detail in Bulletin E-607 of the Bureau of Entomology and Plant Quarantine of the U. S. Dept. of Agriculture.

If the insecticidal composition is desired in the form of liquid to be used as a dispersion or emulsion in water, then it is preferred to prepare a relatively concentrated composition of the active agent dissolved in a suitable solvent selected according to the use to which it is to be put or to prepare an emulsion of the active agent in a non-solvent in certain cases where such technique is more applicable, said solution or emulson subsequently being dispersed in water to permit suitable application. In substantially all compositions prepared for ultimate use as emulsions in water, the essential adjuvant is a wetting, dispersing, or emulsifying agent, such as have been detailed above.

The compositions of the invention include other insect toxicants such as metallic arsenates, fluosilicates, phenothiazines, 2,2-bis(para-chlorophenyl)-1,1,1-trichloroethane and 2,2-bis(para-methoxyphenyl)-1,1,1-trichloroethane, organic thiocyanates such as n-dodecyl thiocyanate, fenchyl thiocyanoacetate and beta(thiocyanoethyl)beta(butoxyethyl)ether, nicotine, anabasine (neo-nicotine), nor-nicotine, rotenone and its congeners, sabadilla, ryania, hellebore, pyrethrum, N-isobutyl-undecylenamide, and aminomethyl sulfides.

The compositions may also contain bactericides and fungicides such as sulfur, polysulfides such as lime-sulfur, the chlorinated phenols, aminomethyl sulfides, copper acylacetonates, copper chelates of beta-keto acids and esters, copper chelates of salicyl-aldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long-chain quaternary ammonium halides and metallic derivatives of dithiocarbamic acid such as ferric dimethyldithiocarbamate.

Compositions containing 2,2-bis(4-methylthiophenyl)-1,1,1-trichloroethane and insecticides and fungicides and insecticidal and fungicidal adjuvants as have been set out may have particular usefulness as special applications and frequently will give better results than would be anticipated from the killing power and repellent action of each ingredient when used alone.

The concentration of insect toxicant necessary to effect kill of the insect varies over a wide range because of the difference in susceptibility of different insects to the material and the effect of the particular type of adjuvant employed and the effect of various modifying agents such as have been fully disclosed. Generally speaking, application of insecticidal compositions containing 0.1 to 50 per cent of 2,2-bis-(4-methylthiophenyl)1,1,1-trichloroethane may be utilized satisfactorily.

The invention may be more fully understood by reference to the following examples.

*Example 1*

This example illustrates a suitable method for the preparation of 2,2-bis(4-methylthiophenyl)-1,1,1-trichloroethane.

Twenty-two and one-tenth (22.1) parts by weight of chloral were added over a 20-minute period to an agitated solution of 20 parts by weight of anhydrous aluminum chloride in 74.5 parts by weight of methyl phenylsulfide. The temperature of the reaction mass was maintained at 5-15° C. during the chloral addition. After completion of the chloral addition, the reaction mass was stirred for an additional 30 minutes and was then added slowly with agitation to about 200 parts by weight of water. The mixture so obtained was subjected to steam distillation and 34 parts by weight of methyl phenyl sulfide were recovered in the distillate.

The product remaining in mixture with water after steam distillation solidified on cooling to give 51 parts by weight of a waxy solid crude 2,2-bis-(4-methylthiophenyl)-1,1,1-trichloroethane. This product was triturated with methanol to yield a white crystalline solid product having a melting point of 116-120° C.

Analysis: Calcd. for $C_6H_{17}Cl_3S_2$: Cl, 28.3%. Found: Cl, 28.5%.

*Example 2*

A fly spray composition is prepared by dissolving 2 parts by weight of the product obtained according to Example 1 in 98 parts by weight of Deo-Base, a proprietary fly spray base solvent of the refined kerosene type.

This liquid composition is highly effective for household use in the control of such insects as flies and mosquitoes.

*Example 3*

Twenty (20) parts by weight of the product of Example 1 and 1 part by weight of technical n-dodecyl alcohol is thoroly mixed with 39.5 parts by weight of ground fuller's earth having an average particle size of about 40 microns. This mixture is then blended with 39.5 parts by weight of finely powdered talc to give a homogeneous powder. The powder is dispersible with water for application to foliage as a spray for the control of insect pests, such as Mexican bean beetle, red spider, and other insect pests.

The proportion of this example may be varied to give a less concentrated product, though in compositions of this type as high a concentration as possible is desirable consistent with a dry, free-flowing powder.

*Example 4*

The 2,2-bis(4-methylthiophenyl)-1,1,1-trichloroethane of Example 1 is dissolved in acetone to a concentration of 2.5 per cent by weight together with 0.25 per cent by weight of a wetting agent known in the trade as IN-438, the active agent of which is the sodium salt of sulfated oleyl acetate. This composition is suitable for dispersing in water to provide a contact insecticidal spray for the control of insect pests such as aphid.

The proportions may be varied to provide greater or less concentration of the active ingredient and other solvents or other wetting agents may be employed.

I claim:

2,2-bis(4-methylthiophenyl)-1,1,1-trichloroethane.

DAVID A. SHIRLEY.

REFERENCES CITED

The following references are of record in the file of this patent:

UNITED STATES PATENTS

| Number | Name | Date |
|---|---|---|
| 2,329,074 | Muller | Sept. 7, 1943 |

OTHER REFERENCES

Elbs, Jour. Prakt. Chem. (2) Vol. 47, page 68 (1893).

Karrer, "Organic Chemistry," 2nd Eng. edit., 1946, page 114.

Science, Vol. 101, No. 2627, May 4, 1945, pages 464-465 by Prill et al.